(No Model.)
J. F. GILLILAND.
GEAR WHEEL.
No. 284,290. Patented Sept. 4, 1883.
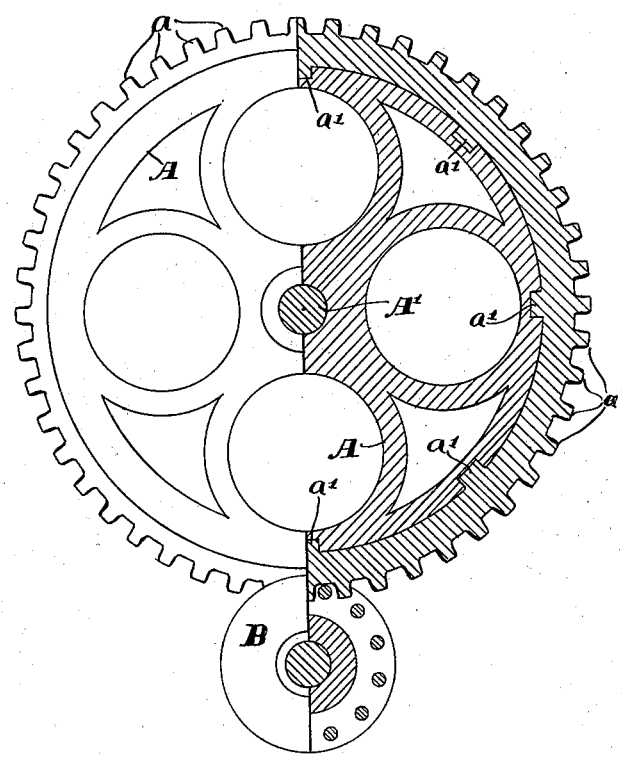
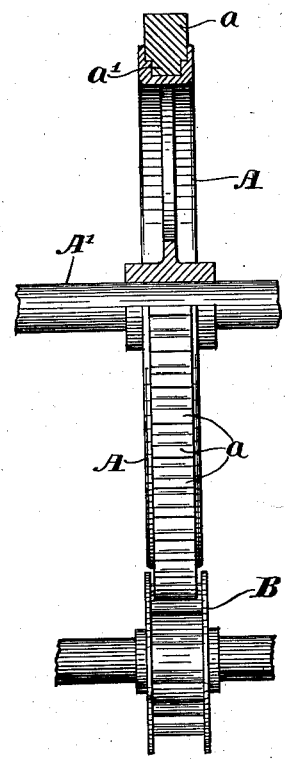
WITNESSES.
Chas. N. Leonard,
E. W. Bradford.
INVENTOR.
James F. Gilliland,
PER C. Bradford.
ATTORNEY.

UNITED STATES PATENT OFFICE.

JAMES F. GILLILAND, OF INDIANAPOLIS, INDIANA.

GEAR-WHEEL.

SPECIFICATION forming part of Letters Patent No. 284,290, dated September 4, 1883.

Application filed May 26, 1883. (No model.)

*To all whom it may concern:*

Be it known that I, JAMES F. GILLILAND, of the city of Indianapolis, county of Marion, and State of Indiana, have invented certain new and useful Improvements in Gear-Wheels, of which the following is a specification.

My present invention consists in a certain construction of one of the wheels of a combined metal and rubber gearing, whereby such a wheel may have both the elasticity and noiselessness of rubber and the strength and cheapness of metal, as will be hereinafter more particularly described.

Referring to the accompanying drawings, which are made a part hereof, and on which similar letters of reference indicate similar parts, Figure 1 is a view of my improved gearing, partly in side elevation and partly in section; and Fig. 2, a view of the same, partly in front elevation and partly in section.

In said drawings, the portions marked A represent the gear-wheel embodying my improvements, and B a lantern-wheel or other desirable form of wheel adapted to engage therewith. The wheel A is mounted on the shaft A' in the usual manner, and is composed of a metal portion, which includes the hub, spokes, or web, and a supporting-felly for the rubber, and a rubber rim mounted upon or in said felly. This rubber rim has cogs *a*, which serve the usual purposes of cogs, and engage with the rundles or cogs of the wheel B, and other cogs or projections, *a'*, which enter the metal portion of the wheel and prevent this rim from slipping thereon. The construction or form of these internal cogs or projections may of course be changed without departing from my invention, and the orifices may be in the rubber and the projections on the metal portion. The projections may also extend transversely of the cogs instead of in line therewith, if desired. Said wheel is preferably produced in the following manner: The rubber portion is first pressed or cast in the required form, and placed in a mold of substantially the shape of the completed wheel. The metal is then poured in to fill the remaining space, and a wheel of the character shown is produced. The metal which I prefer to use is that known as "white-metal," as it is fusible at a comparatively low temperature, casts smoothly, and cools quickly. It will be understood, of course, that the parts may be formed separately and afterward connected together, if desired, without departing from my invention, which consists in the wheel as produced and not in the manner of producing it.

The wheel B may be an ordinary lantern-wheel, as shown, or any other suitable wheel which may be desired or preferred by the manufacturer or user.

Heretofore combined rubber and metal gearing has been objectionable in that the weaker material—rubber—was necessarily used in the smaller wheel, which in use endures the greatest amount of wear. It is impracticable to make the larger wheel of solid rubber, both on account of its excessive cost and because it lacks the necessary rigidity. By my present invention both these objections are overcome, as the smaller wheel, which is subjected to the most wear, is constructed wholly of metal, while the larger wheel, being constructed mostly of metal, has the required rigidity and cheapness, and, having a rubber rim and cogs, has the desired elasticity and noiselessness.

Having thus fully described my said invention, what I claim as new, and desire to secure by Letters Patent, is—

1. A gear-wheel composed of a metal center and a rubber rim, said rim having the usual gear-cogs, and also internal cogs or lugs adapted to fit into orifices in the periphery of said center, substantially as shown and described, and for the purposes specified.

2. A gear-wheel composed of a rubber rim having cogs *a* and inwardly-projecting cogs or projections *a'*, and a metal center cast around and inclosing said cogs *a'* and the inner portion of said rim, substantially as shown and described, and for the purposes specified.

In witness whereof I have hereunto set my hand and seal, at Indianapolis, Indiana, this 22d day of May, A. D. 1883.

JAMES F. GILLILAND. [L. S.]

In presence of—
E. W. BRADFORD,
CHAS. L. THURBER.